United States Patent [11] 3,607,922

| [72] | Inventors | Garry J. K. Acres;<br>Anthony E. R. Budd, both of London, England |
|---|---|---|
| [21] | Appl. No. | 673,947 |
| [22] | Filed | Oct. 9, 1967 |
| [45] | Patented | Sept. 21, 1971 |
| [73] | Assignee | Johnson, Matthey & Co., Limited<br>London, England |
| [32] | Priority | Oct. 13, 1966 |
| [33] | | Great Britain |
| [31] | | 45735/66 |

[54] CATALYTIC OXIDATION OF GLUCOSE
10 Claims, No Drawings

[52] U.S. Cl. .................................................. 260/528,
252/466 PT
[51] Int. Cl. ....................................................... C07c 51/26
[50] Field of Search ........................................... 260/528

[56] References Cited
UNITED STATES PATENTS

| 2,472,168 | 6/1949 | Mehltretter .................. | 260/528 |

FOREIGN PATENTS

| 1,044,563 | 6/1953 | France ......................... | 260/528 |
| 786,288 | 11/1957 | Great Britain ................ | 260/528 |

*Primary Examiner*—James A. Patten
*Assistant Examiner*—Vivian Garner
*Attorney*—Cushman, Darby & Cushman ABSTRACT: This invention relates to the oxidation of glucose to gluconic acid or glucosaccharic acid. An aqueous solution of glucose containing an alkali (the carbonates or bicarbonates of sodium and potassium) is contacted with an oxygen-containing gas in a trickle column reactor in the presence of a supported platinum group metal catalyst.

CATALYTIC OXIDATION OF GLUCOSE

This invention relates to the oxidation of glucose.

The oxidation of glucose provides a route to the selective production of:

gluconic acid $CH_2OH(CHOH)_4COOH$ and glucosaccharic acid $COOH(CHOH)_4COOH$

It has previously been proposed to produce gluconic acid in a batchwise manner using an aqueous solution of glucose with palladium on charcoal or palladium on alumina catalyst in the presence of air in a vigorously stirred reactor at a temperature below 55° C. The pH of the reactant is maintained at 8–11 by the continuous addition of an alkali metal hydroxide (usually sodium hydroxide) and the total reaction time is 7–9 hours giving a final yield of 80 percent gluconic acid. The presence of alkali is essential since below pH 8 the reaction will not proceed or at the best will be very slow. Although such a batch process produces a generally satisfactory product, the process is, by its very nature an intermittent and, consequently, a slow process.

It is an object of the present invention to provide a continuous process for the oxidation of glucose to produce gluconic acid and/or glucosaccharic acid. The problem confronting the Applicants to achieve such a continuous process was that of overcoming the continuous addition of alkali to the reactant. During their investigations the Applicants found that a continuous process in which the theoretical amount of sodium hydroxide was added to the glucose feed stock caused the solution so formed to turn yellow and then brown indicating that considerable polymerization had taken place.

Applicants have now discovered a most satisfactory method for the oxidation of glucose. Accordingly, the invention comprises a method for the continuous oxidation of glucose to gluconic acid or glucosaccharic acid, in which an aqueous solution of glucose containing alkali selected from the carbonates and bicarbonates of sodium and potassium is contacted with an oxygen-containing gas in a trickle column reactor in the presence of a supported platinum group metal catalyst.

The platinum group of metals are platinum, palladium, iridium, osmium, rhodium and ruthenium.

Where the glucose is to be converted to gluconic acid it has been found preferable to use a palladium catalyst, preferably on a nonporous support. Preferably, the catalyst comprises palladium metal deposited on a substantially nonporous alpha alumina support. One form of suitable catalyst support is ALCOA 8–14 mesh tabular alumina T61 having an average surface area of 0.04 m.$^2$/g. and an apparent porosity of 5 percent. The alpha alumina can be, for instance, of 4–8 mesh or coarser mesh but preferably is not finer than 8–14 mesh. The catalyst can be in various forms, for instance, granules, spheres or pellets, but granules are preferred.

The amount of metal on the support is conveniently in the range 0.1–2 percent by weight, especially where the metal is palladium.

The catalyst may be made in any suitable manner, for example, 8–14 mesh alumina granules may be impregnated with an aqueous solution of a palladium salt, dried so as to leave a deposit on, and within, the granules and then heated under reducing conditions so as to cause the so deposited palladium salt to be reduced to the metal. Suitable salts for this purpose are palladium nitrate, palladium chloride and palladium ammino nitrate.

For the conversion of glucose to gluconic acid the alkali is conveniently sodium carbonate. It has been found that the use of 1 equivalent of sodium carbonate in the glucose feedstock produces a highly satisfactory yield of gluconic acid. If desired, 1 to 2 equivalents may be used, but as the concentration of sodium carbonate increases, the yield of gluconic acid obtained tends to decrease.

Where the glucose is to be converted to glucosaccharic acid it has been found very convenient to use a platinum catalyst, preferably platinum supported on charcoal. Sodium carbonate is an excellent alkali for this reaction, but it is preferably used in an amount of two or more equivalents for each equivalent of glucose. However, the use of large amounts of sodium carbonate should be avoided because it leads to undesirable polymerization.

The oxidation products of this invention, whether gluconic acid or glucosaccharic acid, are generally obtained in the form of their sodium or potassium salts, and the free acids can readily be obtained by conventional methods.

The oxidation agency may be any gas containing oxygen in appreciable amounts such as atmospheric air, gaseous oxygen or mixtures of gaseous oxygen with other inert gases. In general gaseous oxygen is preferred.

The temperature for the oxidation can be in the range 15–75°< C., especially 40–60° C.

The concentration of glucose in the feedstock is not critical and can be, for instance, be in the range 1%–40% weight/volume.

The invention is illustrated by the following examples.

EXAMPLE 1

This example describes the oxidation of glucose to gluconic acid using as catalyst a 8–14 mesh nonporous alpha alumina carrying 1% by weight of palladium.

The trickle column reactor used consisted essentially of a column 32 cm. long and 4 cm. in diameter packed with 400 ml. of the palladium catalyst. The column was mounted vertically and heated to 50° C. and a glucose feed liquor consisting of a 1 M aqueous solution (18% weight/volume) containing 76.5 g./l. of sodium carbonate (0.75 M) was poured at the rate of 300 ml. per hour into the top of the column so that it trickled slowly over the catalyst granules. Concurrently, a stream of oxygen was passed into the bottom of the column at the rate of 1500 ml. per minute.

Samples of the effluent from the bottom of the column were taken at intervals and analyzed. The results obtained are given in Table I below from which it can be seen that there was only a slight decrease in activity of the catalyst over the period of the oxidation.

TABLE I

| Time after start sample taken (hours) | Conversion (%) |
|---|---|
| 1 | 54.0 |
| 2.5 | 51.0 |
| 4 | 50.2 |
| 5.5 | 49.1 |
| 6.25 | 48.7 |
| Reaction stopped overnight | |
| 2 | 57.5 |
| 3 | 55.1 |
| 6.25 | 52.3 |

EXAMPLE 2

Example 1 was repeated but using as catalyst carbon granules carrying 2% by weight of palladium. The effluent was sampled as in example 1 and the results are given in Table II.

TABLE II

| Time after start sample taken (hours) | Conversion (%) |
|---|---|
| 1 | 50.0 |
| 6.25 | 33.9 |
| Reaction stopped overnight | |
| 2 | 56.6 |
| 3 | 42.0 |

EXAMPLE 3

The method of example 1 was repeated except that certain of the features were changed as follows:

Sodium carbonate concentration: approx. 0.5 M (50.24 g. per liter).
Feed stock flow rate: 150 ml./hour
Temperature: 45° C.
Catalyst: 840 ml. 0.1% palladium on alpha alumina (8–14 mesh)
Reactor: 70 cm.×4 cm.
The conversion of glucose obtained was 92.5%.

EXAMPLE 4

The method of example 1 was repeated except that certain of the features were changed (especially in that sodium bicarbonate was used instead of sodium carbonate) as follows:
Sodium bicarbonate concentration: approx. 1M (81.65 g. per liter).
Feed stock flow rate: 150 ml. per hour
Temperature: 50° C.
Catalyst: 840 ml. 1% palladium on alpha alumina
Reactor: 70 cm.×4 cm.
The conversion of glucose obtained was 100%.

EXAMPLE 5

This example describes the oxidation of glucose to glucosaccharic acid using as catalyst carbon granules carrying 3% by weight of platinum.
The trickle column reactor consisted of a column 210 cm. long and 4 cm. in diameter packed with 2520 ml. of the catalyst. The oxidation was carried out using the procedure or example 1 except that certain of the features were changed as follows:
Glucose concentration: 92.5 g./liter (9.25% solution)
Sodium carbonate concentration: approx. 0.5 M (52.4 g./liter)
Feed stock flow rate: 150 ml./hour
The conversion of glucose obtained was 84.6%.

We claim:
1. In a method for the oxidation of glucose to an acid selected from the group consisting of gluconic acid and glusaccharic acid, wherein an aqueous solution of glucose is contacted with oxygen in the presence of catalyst and alkali, the improvement wherein the process is carried out continuously by passing an aqueous solution of glucose and sodium carbonate through a trickle column reactor packed with a supported platinum group metal catalyst so that said solution trickles over said catalyst, passing an oxygen-containing gas through said reactor in contact with the solution trickling therethrough and thereafter, converting the resulting sodium salt to the corresponding free acid and recovering said free acid, the amount of sodium carbonate being at least 1 equivalent for each equivalent of glucose but insufficient to cause undesired polymerization of the glucose.

2. A method according to claim 1, in which the platinum group metal is palladium 3. A method according to claim 1, in which said acid is gluconic acid and the catalyst is a nonporous palladium supported catalyst.

4. A method according to claim 3, in which the amount of the alkali is 1–2 equivalents for each equivalent of glucose.

5. A method according to claim 1, in which said acid is glucosaccharic acid and the catalyst is a platinum catalyst supported on charcoal.

6. A method according to claim 5, in which the amount of the alkali is 2 or more equivalents per equivalent of glucose.

7. A method according to claim 1, in which the amount of glucose in the feed stock is in the range 15–25 grams per 100 ml. of solution.

8. A method according to claim 1, in which the trickle column reactor comprises a tube packed with the catalyst.

9. A method according to claim 1, in which the temperature at which the oxidation is carried out is in the range 40°–60° C.

10. The method of claim 1 wherein the catalyst is supported on nonporous alpha alumina particles not finer than 8–14 mesh.